2,710,300

DITHIOL ADIPATES

Herbert B. Fernald, O'Hara Township, Allegheny County, and Albert S. Orr, Mount Lebanon, Pa., assignors, by direct and mesne assignments, to Gulf Research & Development Company, Pittsburgh, Pa., a corporation of Delaware No Drawing. Application Aug. 7, 1953,
Serial No. 373,059

4 Claims. (Cl. 260—455)

This invention relates to esters, and more particularly it is concerned with new chemical compounds which are especially suitable for use as synthetic lubricants, i. e., for providing a lubricating film between metal surfaces moving in contact with and relative to each other.

The new compounds of our invention are dithiol esters selected from the group consisting of di-2-ethyl-hexyl dithiol adipate, di-iso-octyl dithiol adipate and di-2-octyl dithiol adipate. In other words, the esters of our invention are di-esters of adipic acid and 2-ethyl-hexyl, iso-octyl and 2-octyl (secondary octyl) mercaptans.

The compounds of this invention are clear viscous liquids. All of them have high boiling points, generally in excess of about 400° F. at 10 mm. Hg, a high flash point, a low pour point and a high viscosity index, all of which properties make them particularly suitable for use as synthetic lubricants. The presence of sulfur in the molecule renders our esters particularly advantageous for use in those lubricant applications where good load carrying characteristics are required. The esters are quite stable and can be distilled at temperatures well over 400° F. without decomposition.

The dithiol esters of our invention can be prepared by any suitable method, for example, by direct esterification between the adipic acid and the selected mercaptan. However, generally speaking, direct esterification does not ordinarily give high yields of the desired product, and it is therefore preferred to prepare the esters by reaction of the mercaptan with an adipyl halide. In the latter procedure, it is desirable to add stoichiometric amounts of pyridine to react with the hydrogen halide formed in the reaction. The pyridine-hydrohalide separates as a crystalline material and can be removed from the reaction mixture by filtration. The ester product is recovered by fractional distillation; the yields obtained are on the order of 80–95 per cent.

The mercaptans employed in the preparation of our esters can be obtained from the corresponding monohydric alcohols in any known manner, e. g., (1) by converting the alcohol to the bromide and reacting the bromide with an equimolar amount of thiourea followed by reaction with sodium hydroxide, (2) by reacting an alkyl halide with sodium hydrosulfide in alcoholic solution, (3) by catalytically reacting hydrogen sulfide and the alcohol in the vapor phase, etc.

The following example is illustrative of one method of preparing the esters of this invention.

*Example I.*—Iso-octyl alcohol was obtained from the Oxo process using heptenes as the charge stock. The heptenes, in turn, were obtained as a copolymer of propylene and butylenes in the presence of a phosphoric acid catalyst, the fraction of the copolymer boiling between 170° and 210° F. and having a heptene content of about 90 to 100 per cent being used as the charge stock. The corresponding mercaptan was obtained from the iso-octyl alcohol in known manner by converting the alcohol to the bromide and reacting the bromide with an equimolar amount of thiourea followed by reaction with sodium hydroxide. It should be understood that, as used herein and in the appended claims, the term "iso-octyl" refers to the branched chain octyl radicals obtained in the iso-octyl alcohol made by the Oxo process.

Iso-octyl mercaptan, as prepared above, was charged in an amount of 293 grams (2 mols) to a 1-liter, 3-necked flask equipped with stirrer, reflux condenser, pot thermometer and dropping funnel. Pyridine, in an amount of 200 grams (2½ mols), was also added to the flask. While stirring vigorously and with cooling to maintain the temperature at 20° C. or below, 191 grams (1 mol) of adipyl chloride (95 per cent purity) were added to the flask over a period of about two hours. During the addition the reaction temperature varied from 15°–20° C. Early in the addition of the adipyl chloride, pyridine hydrochloride separated out as a white granular precipitate, and benzene was added to facilitate stirring during the latter part of the addition when a considerable amount of the precipitate had accumulated. After all the adipyl chloride had been added, the reaction mixture was stirred at room temperature for about one hour, and then the temperature was raised to 90°–95° C. for two hours to complete the reaction. The reaction mixture was filtered at room temperature to remove the pyridine hydrochloride. The benzene was removed from the filtrate by fractionation through a column packed with glass helices. Thereafter, the distillation was continued under greatly reduced pressure in a still in which the pot was connected directly to the still head. The product distilling at 470°–475° F. at 0.8 mm. was the desired product, di-iso-octyl dithiol adipate, and was obtained in a yield of 85.5 per cent. It contained 15.70 per cent of sulfur, as determined by analysis, as compared to a calculated amount of 15.92 per cent.

Typical properties of the esters of our invention are shown in Table I.

TABLE I

| | Boiling Point, ° F. | Melting Point, ° F. | Specific Gravity, 60°/60° F. | R. I., $n_D^{20}$ | Sulfur Analysis, Percent | |
|---|---|---|---|---|---|---|
| | | | | | Found | Theory |
| Di-2-ethyl-hexyl dithiol adipate | 428° at 0.2 mm | <-75 | | 1.4927 | 15.70 | 15.92 |
| Di-iso-octyl dithiol adipate | 472–4° at 0.8 mm | <-75 | | 1.4863 | 15.70 | 15.92 |
| Di-2-octyl dithiol adipate | 482° at 10 mm | | 0.9665 | 1.4912 | 14.80 | 15.92 |

As has been indicated previously, the esters of our invention are particularly suited for lubricant applications. The requirements for satisfactory lubricants vary widely, depending upon the specific mechanism, engine or apparatus to be lubricated and the conditions under which the lubricating function is exercise. Thus, in many instances, it is required that a lubricant possess a minimal change of viscosity with change of temperature, i. e., a resistance to excessive thinning at high temperatures and excessive thickening at low temperatures as indicated by a high viscosity index. Similarly, the viscosity at any given temperature, the pour point, flash point, load carrying capacity, etc. of a lubricant may be critical in certain applications. Frequently, a lubricant must possess such a combination of properties as to enable its use over a wide variety of conditions.

As shown in Table II, the esters of our invention exhibit a combination of properties which make them superior lubricants for many applications.

TABLE II

| Compound | Viscosity in Centistokes | | | | Viscosity Index | Pour Point, °F. | Flash Point, °F. |
|---|---|---|---|---|---|---|---|
| | 210° F. | 130° F. | 100° F. | −65° F. | | | |
| Di-2-ethyl-hexyl dithiol adipate | 3.12 | 7.89 | 12.84 | 13,111 | 132 | <−75 | 450 |
| Di-iso-octyl dithiol adipate | 3.58 | 8.71 | 13.96 | 11,941 | 160 | <−70 | 405 |
| Di-2-octyl dithiol adipate | 3.28 | 8.34 | 13.78 | 12,948 | 121 | <−70 | |

The esters of our invention are highly superior for the lubrication of turboprop and turbojet aircraft engines. Such engines must function at temperatures as low as −65° F. so that the lubricant must be sufficiently fluid at that temperature to permit engine starting. At the same time, the lubricant must also perform satisfactorily once the engine reaches operating temperatures. As a practical maximum, it has been indicated that a lubricant must not have a viscosity in excess of about 13,000 centistokes at temperatures of −65° F.; nevertheless, the viscosity at higher temperatures, such as at 100° F. and 210° F., should preferably be in excess of about 11.0 and 3.0 centistokes, respectively. In addition to these requirements, the lubricant must also have a minimum flash point of 385° F. and a pour point on the order of −70° or −75° F. or below. As shown in Table II, our esters can meet these stringent requirements.

It will be understood by those skilled in the art that for certain lubricant applications, the esters of our invention may require the addition of certain "additive" compounds in order to meet special requirements. For example, antioxidants such a 2,6-di-tertiarybutyl-4-methyl phenol and phenothiazine, anti-foam agents such as liquid dimethyl silicone polymers, and extreme-pressure agents such as tricresyl phosphate can be added to the ester lubricants of our invention to improve one or more properties thereof.

It has been proposed in the prior art to use certain diesters of monohydric alchols and aliphatic dicarboxylic acids as bases for synthetic lubricants. Surprisingly, it has been found that the dithiol esters of this invention have superior viscometric properties to the corresponding oxygen esters. Thus, the viscosities of the dithiol esters are at least 40 per cent higher and the viscosity indices are 10 to 15 per cent higher than the corresponding oxygen esters. Notwithstanding this, the pour points of the dithiol esters are similar to those of the corresponding oxygen esters and are on the order of below −70° to −75° F. The superior viscometric properties of the dithiol esters to the corresponding alcohol esters are clearly shown in Table III.

TABLE III

*Comparison of viscosity data of sulfur diesters and oxygen diesters*

| Compound | Viscosity in Centistokes | | | Viscosity Index | Pour Point, °F. |
|---|---|---|---|---|---|
| | 210° F. | 130° F. | 100° F. | | |
| Di-2-ethyl-hexyl dithiol adipate | 3.12 | 7.89 | 12.84 | 132 | <−75 |
| Di-2-ethyl-hexyl adipate | 2.38 | 5.34 | 8.22 | 121 | −90 |
| Di-iso-octyl dithiol adipate | 3.58 | 8.71 | 13.96 | 160 | <−70 |
| Di-iso-octyl adipate | 2.85 | 6.54 | 10.19 | 144 | |

Furthermore, it has also been found that the dithiol esters are significantly superior to the corresponding oxygen esters from the standpoint of reducing wear and increasing load carrying capacity. This is shown in Table IV. Where still greater improvement in extreme-pressure properties is required, extreme pressure agents can be added to the esters, as indicated earlier in this specification.

TABLE IV

*Friction tests on thiol ester type synthetic lubricants*

| Material | Falex Tests | | Modified Herschel Test |
|---|---|---|---|
| | Wear Steel-Steel 100-Pound Gage Load 3-Hr. Test Period Wear: No. of Teeth, Total | Seizure Steel-Steel, Seconds at Lb. Load | Coefficient of Static Friction Steel-Steel |
| Di-iso-octyl adipate | 34 | 45 at 1,250 | 0.24 |
| Di-iso-octyl dithiol adipate. | 25 | 4,000 [1] | 0.20 |

[1] 4000 lb. is maximum loading capacity of Falex machine; there was no seizure.

It will be apparent from the foregoing description that we have provided a new class of synthetic lubricants which are adapted for use over a wide variety of conditions and which exhibit superior lubricating properties under extreme conditions.

We claim:

1. As new compounds, dithiol esters selected from the group consisting of di-2-ethyl-hexyl dithiol adipate, di-iso-octyl dithiol adipate and di-2-octyl dithiol adipate.
2. Di-2-ethyl-hexyl dithiol adipate.
3. Di-iso-octyl dithiol adipate.
4. Di-2-octyl dithiol adipate.

References Cited in the file of this patent

UNITED STATES PATENTS 2,499,848    Catlin et al. _____ Mar. 7, 1950

OTHER REFERENCES

Marvel et al.: J. A. C. S., vol. 73, pp. 1100–1102 (1951).
Murphy et al.: Ind. & Eng. Chem., vol. 45, pp. 1766–1774 (August 1953).